(12) United States Patent
Etzel et al.

(10) Patent No.: US 12,055,104 B2
(45) Date of Patent: Aug. 6, 2024

(54) CONTROL UNIT AND METHOD FOR OPERATING A HYBRID DRIVE

(71) Applicant: Bayerische Motoren Werke Aktiengesellschaft, Munich (DE)

(72) Inventors: Michael Etzel, Munich (DE); Michael Friedrich, Eching (DE); Sebastian Liebert, Unterfoehring (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 263 days.

(21) Appl. No.: 17/283,388

(22) PCT Filed: Nov. 13, 2019

(86) PCT No.: PCT/EP2019/081088
§ 371 (c)(1),
(2) Date: Apr. 7, 2021

(87) PCT Pub. No.: WO2020/114734
PCT Pub. Date: Jun. 11, 2020

(65) Prior Publication Data
US 2021/0381446 A1    Dec. 9, 2021

(30) Foreign Application Priority Data

| Dec. 4, 2018 | (DE) | 10 2018 130 886.8 |
| Jan. 10, 2019 | (DE) | 10 2019 100 501.9 |
| Mar. 26, 2019 | (DE) | 10 2019 107 772.9 |

(51) Int. Cl.
*F02D 13/08* (2006.01)
*B60K 6/24* (2007.10)
(Continued)

(52) U.S. Cl.
CPC ............... *F02D 13/08* (2013.01); *B60K 6/24* (2013.01); *B60K 6/26* (2013.01); *B60K 6/36* (2013.01);
(Continued)

(58) Field of Classification Search
CPC ...... F02D 13/08; F02D 13/0203; F02D 13/06; F02D 41/0005; F02D 2041/0012;
(Continued)

(56) References Cited

U.S. PATENT DOCUMENTS

| 6,943,460 B2 * | 9/2005 | Wakashiro | B60L 50/16 290/40 C |
| 6,950,739 B2 * | 9/2005 | Matsubara | F01L 1/185 180/65.285 |

(Continued)

FOREIGN PATENT DOCUMENTS

| CN | 101316748 A | 12/2008 |
| CN | 104487302 A | 4/2015 |

(Continued)

OTHER PUBLICATIONS

International Search Report (PCT/ISA/210) issued in PCT Application No. PCT/EP2019/081088 dated Jan. 24, 2020 with English translation (five (5) pages).

(Continued)

*Primary Examiner* — Audrey B. Walter
(74) *Attorney, Agent, or Firm* — Crowell & Moring LLP

(57) ABSTRACT

A controller and a method for a hybrid drive, which includes an internal combustion engine and an electrical machine are provided. The internal combustion engine includes adjustment devices that deactivate the intake and exhaust valve opening actuation. The controller is designed in such a way that, in the case of at least one specified condition (such as regeneration during unfired overrun or in the case of electric (Continued)

travel, in particular in the case of operation with high activation frequency of the internal combustion engine, e.g., in charge sustaining or HEV operation), the intake and exhaust valves are kept at least approximately (preferably completely) closed at least approximately simultaneously while the internal combustion engine is unfired. The internal combustion engine must be connected to the electrical machine. If there is a disconnect clutch, the disconnect clutch is brought into the closed state or remains closed.

5 Claims, 2 Drawing Sheets

(51) Int. Cl.
| | |
|---|---|
| *B60K 6/26* | (2007.10) |
| *B60K 6/36* | (2007.10) |
| *B60K 6/38* | (2007.10) |
| *B60K 6/387* | (2007.10) |
| *B60K 6/48* | (2007.10) |
| *B60K 6/547* | (2007.10) |
| *B60W 10/06* | (2006.01) |
| *B60W 10/08* | (2006.01) |
| *B60W 20/10* | (2016.01) |
| *B60W 20/15* | (2016.01) |
| *F02D 13/02* | (2006.01) |
| *F02D 13/06* | (2006.01) |
| *F02D 41/00* | (2006.01) |
| *F16H 57/00* | (2012.01) |
| *B60W 30/18* | (2012.01) |
| *F16H 57/04* | (2010.01) |

(52) U.S. Cl.
CPC ............... *B60K 6/387* (2013.01); *B60K 6/48* (2013.01); *B60K 6/547* (2013.01); *B60W 10/06* (2013.01); *B60W 10/08* (2013.01); *B60W 20/10* (2013.01); *B60W 20/15* (2016.01); *F02D 13/0203* (2013.01); *F02D 13/06* (2013.01); *F02D 41/0005* (2013.01); *F16H 57/0006* (2013.01); *B60K 2006/268* (2013.01); *B60K 2006/4825* (2013.01); *B60W 30/18127* (2013.01); *B60Y 2200/92* (2013.01); *F02D 2041/0012* (2013.01); *F02D 2200/101* (2013.01); *F02D 2200/503* (2013.01); *F16H 2057/0012* (2013.01); *F16H 57/04* (2013.01)

(58) Field of Classification Search
CPC ......... F02D 2200/101; F02D 2200/503; B60K 6/24; B60K 6/26; B60W 10/06; B60W 10/08; B60W 20/10; B60W 20/15; B60W 30/18127; B60Y 2200/92

See application file for complete search history.

(56) References Cited

U.S. PATENT DOCUMENTS

| | | | |
|---|---|---|---|
| 7,540,344 B2 * | 6/2009 | Yamamoto | B60W 50/08 180/65.285 |
| 9,919,701 B2 * | 3/2018 | Kuroda | B60K 6/547 |
| 2003/0236599 A1 * | 12/2003 | Saito | F02D 41/0087 903/917 |
| 2004/0026928 A1 * | 2/2004 | Wakashiro | F02D 17/02 290/40 C |
| 2004/0144347 A1 | 7/2004 | Schleusener et al. | |
| 2009/0152027 A1 * | 6/2009 | Kusaka | F02D 13/08 180/65.28 |
| 2015/0166066 A1 * | 6/2015 | Suzuki | B62D 5/0481 477/174 |
| 2016/0101770 A1 | 4/2016 | Yamazaki et al. | |

FOREIGN PATENT DOCUMENTS

| | | |
|---|---|---|
| DE | 101 23 186 A1 | 11/2002 |
| EP | 1 329 620 A1 | 7/2003 |
| EP | 1 953 055 A1 | 8/2008 |
| EP | 1 329 620 B1 | 5/2010 |
| EP | 3 072 764 A1 | 9/2016 |
| WO | WO 2014/064504 A1 | 5/2014 |

OTHER PUBLICATIONS

German-language Written Opinion (PCT/ISA/237) issued in PCT Application No. PCT/EP2019/081088 dated Jan. 24, 2020 (six (6) pages).
German-language Search Report issued in German Application No. 10 2019 107 772.9 dated May 20, 2020 with partial English translation (11 pages).
German-language Office Action issued in German Application No. 10 2019 107 772.9 dated Sep. 8, 2020 (five (5) pages).
Chinese-language Office Action issued in Chinese Application No. 201980064606.2 dated Nov. 29, 2023 with English translation (14 pages).
Chinese Office Action issued in Chinese Application No. 201980064606.2 dated May 10, 2024 with English translation (14 pages).

* cited by examiner

CONTROL UNIT AND METHOD FOR OPERATING A HYBRID DRIVE

BACKGROUND AND SUMMARY OF THE INVENTION

The invention relates to a control unit and to a method for operating a hybrid drive for a motor vehicle having at least one electric motor (also referred to as an electric machine) and an internal combustion engine (VKM) which can be respectively used individually or together, in order to provide a drive torque which is mostly required at a transmission of the vehicle.

In the case of hybrid vehicles, both various hybrid drive topologies and various operating strategies are known, in particular for reducing the emissions and consumption. In this context, according to the prior art the internal combustion engine should be operated as little as possible. However, the deactivation and activation of the internal combustion engine consume energy and take up time, as well as (for the most part) affecting the comfort and the dynamics of the vehicle.

The object of the invention is to improve the comfort and the dynamics of the vehicle in a control unit and a method for operating a hybrid drive while maintaining the reduction in consumption.

This object is achieved by means of the features of the independent patent claims. The subject matter of the dependent patent claims are advantageous developments of the invention.

The invention relates to a control unit and a method for a hybrid drive which comprises an internal combustion engine and an electric machine, wherein the internal combustion engine has adjustment devices (for example, fully variable valve stroke control means and/or valve opening actuators which can be activated/deactivated) at least in order to deactivate the inlet valve and outlet valve opening actuation. According to the invention, the control unit is designed according to the invention (e.g., by means of a software program module in the form of a drag torque reduction functional module) in such a way that under at least one specified condition (in particular in the case of recuperation in the overrun mode when the engine is non-activated or in the case of purely electric driving, in particular in a mode with a high activation frequency of the internal combustion engine when it is activated, e.g., in the "charge sustaining" mode or in the HEV mode) the actuation of the inlet valves and outlet valves when the internal combustion engine is non-activated is completely or at least almost completely deactivated at the same time or at least virtually at the same time. In this context, the internal combustion engine must be connected to the electric machine. When an engine clutch is possibly present between the internal combustion engine and the electric machine said clutch is closed or remains closed.

The Invention is Based on the Following Realizations:

When the internal combustion engine is restarted and the necessary tractive force bypass occurs by means of the electric machine until the tractive force is taken up by the activated internal combustion engine, considerable amounts of energy are undesirably consumed and time passes.

In known hybrid drive topologies with a clutch between the internal combustion engine and the electromotor, in the case of purely electric driving the internal combustion engine is generally uncoupled by opening the clutch. Until now, purely electric driving with an entrained or coupled internal combustion engine has not been used owing to the high drag torques.

The invention provides that, under specified operating conditions, in particular in the state of purely electric driving and/or in the case of recuperation, the internal combustion engine is not uncoupled (if this is at all possible) but rather the drag torque over the internal combustion engine is lowered as well as possible.

In this context, provision is made according to the invention for actuating, in particular, gas exchange valve control devices (for cylinder inlet valves and cylinder outlet valves) which are actually provided for controlling the charge when an internal combustion engine is non-activated, in the sense of at least virtually complete, preferably complete, continuous closing of the inlet valves and outlet valves in the non-activated mode of the internal combustion engine. The non-activated, entrained mode of the internal combustion engine with the inlet valves and outlet valves closed in such a way is preferably activated either in the case of purely electric driving (positive drive torque) under certain conditions or in the case of recuperation (negative drive torque) under certain conditions.

According to the invention, i.e., in the non-activated mode of the internal combustion engine, both in the case of hybrid architectures which have a fixed coupling of the electric machine to the internal combustion engine (VKM) (e.g., so-called P0 drive train, see FIG. 3 and so-called P1 drive train, see FIG. 2) as well as the hybrid architectures which have a clutch between the internal combustion engine and electric machine (e.g., so-called P2 drive train, see FIG. 1, in this instance with the clutch kept closed) the drag torque is significantly reduced by closing the inlet valves and outlet valves at the internal combustion engine.

A particularly advantageous embodiment of the closure of the valves both for entrained, purely electric driving and for entrained recuperation is fully variable valve stroke control on the inlet side and simple deactivation of the valve drive by means of a switching actuator system on the outlet side. For an explanation of the basic design of a possible valve control device for fully variable valve stroke control, reference is made, for example, to DE 101 23 186 A1.

Case 1, for Recuperation:

Irrespective of a specific hybrid architecture (see exemplary embodiments), it is possible to increase the amount of energy which can be recuperated in recuperation phases by deactivating the cylinder gas exchange of the internal combustion engine by means of devices on the valves of the cylinders which can be variably adjusted and/or activated/deactivated, so that loss torque portions of the internal combustion engine through the gas exchange no longer occur.

An important strategy for minimizing the consumption is to recuperate the kinetic energy of the vehicle by means of an electric machine. In particular, known hybrid architectures which have a fixed coupling of the electric machine to the internal combustion engine (VKM) (typically P0, see FIG. 3, and P1, see FIG. 2) would have to accept the drag torque of the internal combustion engine as a loss in recuperation according to the prior art, and would therefore have to accept a lower take-up of energy. A reduction of the drag torques of the internal combustion engine in the case of recuperation is necessary in order to increase the recuperation efficiency.

For this purpose, according to the invention preferably in the case of recuperation the non-activated internal combustion engine is therefore entrained and also the valve control devices are actuated in such a way that the inlet valves and outlet valves are closed.

Case 2, for Purely Electric Driving:

Even in the case of purely electric driving, according to the invention a hybrid drive architecture composed of an internal combustion engine and an electric machine is, counter to all earlier findings, used even in the case of so-called P2 architecture (with a clutch between the internal combustion engine and electric machine) as P1 architecture (by means of a closed clutch such as without a clutch between the internal combustion engine and electric machine), wherein the internal combustion engine is preferably configured to close the inlet valves and outlet valves with, in each case, a freely controllable device which is used for electric driving with an internal combustion engine, which is entrained in the non-activated mode, as a drag torque reduction device. In this context, both devices are as far as possible actuated simultaneously to close the inlet valves and outlet valves as a drag torque reduction measure. As in the case of recuperation, the cylinders of the internal combustion engine are preferably also closed by means of devices which can be variably adjusted and/or activated/deactivated at the valves of the cylinders in order to prevent the charge exchange.

Furthermore, it is proposed that for the state of electric driving, in which case only the electric machine provides drive torque in the vehicle while outputting a positive torque, the internal combustion engine remains permanently coupled with activated, drag-reducing measures. It is therefore possible at any time to quickly change between the electric mode and the combined or pure internal combustion engine mode without having to invest large amounts of energy in starting the internal combustion engine.

This operating mode can be used both in the HEV and in PHEV vehicles, or independently of the architecture in the various hybrid topologies, and can be used situationally for optimized operating strategies which permit efficient operation with the vehicle. In this context, the voltage level of the electric machine can be either in the low voltage range (typically <60 V) or in the high voltage range (>60 V).

Known operating strategies, in particular in the case of (plug-in) hybrid vehicles as a parallel hybrid with P2 architecture differ depending on the state of charge (SOC) of the battery, between the "charge depleting" operating mode (SOC is high and SOC is lowered) and the "charge sustaining" operating mode (SOC is low and is to be maintained).

In the "charge depleting" mode, the drive occurs essentially electrically, that is to say the internal combustion engine is decoupled by means of the clutch and adjusted to the rotational speed 0. The starting frequency of the internal combustion engine is low. The electric driving occurs into the high driving performance ranges.

In the "charge sustaining" mode, the internal combustion engine is preferably decoupled in overrun phases and when the driving performance is low by means of the clutch and adjusted to the rotational speed 0. Electric driving takes place only when there is a low driving performance. In the case of a load request, by the driver, the internal combustion engine must be started and coupled. The starting frequency is substantially higher than in the "charge depleting" operating mode.

SOC generally stands for state of charge and describes the state of charge of an energy store. Consequently, this value therefore describes to what extent a battery is charged.

Disadvantages of the abovementioned "charge sustaining" strategy are the high starting frequency, adverse effects on comfort when starting, adverse response effects when starting, high starting reserves in the driving performance of the electrical system, component loading in the starting device, component loading of the internal combustion engine, emission disadvantages when starting and undesired energetic additional expenditure for starting with a reduction in energy gained from recuperation in comparison with the positioning period of the internal combustion engine. The strategy of reducing the starting frequency by enlarging the SOC stroke gives rise to $CO_2$ disadvantages as a result of the double conversion of energy.

Consequently, the known strategies and methods are highly disadvantageous and there is a need for an improved method for controlling a hybrid vehicle.

The present invention is accordingly preferably applied when the starting frequency drops below a specific threshold value and/or when the "charge sustaining" operating mode is active. In the case of hybrid vehicles with P2 architecture, the clutch between the internal combustion engine and the electric motor (=electric machine) is accordingly closed when the "charge sustaining" condition is met in the purely electric driving mode for entraining the non-activated internal combustion engine, and the inlet valves and outlet valves are likewise closed in order to activate the reduction in drag torque.

In contrast to the known methods, there is provision according to the invention that in the "charge sustaining" mode the internal combustion engine always remains coupled, and therefore always remains coupled even if it does not provide any power at all. Therefore, the electric motor is continuously operated and when there is an additional requirement for power the internal combustion engine is then additionally used. However, according to the invention this does not require the internal combustion engine to be firstly started and coupled to the drive since the latter always remains coupled by means of a closed clutch (P2) or in any case cannot be disconnected (P0, P1). Consequently, various coupling processes are refrained from.

However, according to the proposed method, a system arrangement such as is already known can be used again. For this purpose, the known system arrangement is to be actuated in such a way that the coupling processes are executed according to the proposed method in order to implement the efficient operating strategy. Therefore, according to the invention the advantage is obtained that the invention can be implemented by simple technical means and, in particular, certain motor vehicles can be easily retrofitted. For this purpose, typically there is no need at all for physical adaptations but rather the proposed method can be programmed into a control apparatus and then executed.

It is to be noted that additional features of a patent claim which is dependent on an independent patent claim can form, without the features of the independent patent claim or only in combination with a subset of the features of the independent patent claim, a separate invention which is independent of the combination of all the features of the independent patent claim and which can be made a subject matter of an independent claim, of a partial application or of a subsequent application. This applies in the same way to technical teachings which are described in the description and can form an invention which is independent of the features of the independent patent claims.

According to a further aspect, a software (SW) program is used in a control unit. The SW program can be configured to be executed in a processor of the control unit (e.g., in a control apparatus of a vehicle) and as a result to execute the method described in this document.

According to a further aspect, a storage medium is described. The storage medium can comprise an SW program which is configured to be executed in a processor and as a result to execute the method described in this document.

It is to be noted that the methods, devices and systems described in this document can be used either alone or in combination with other methods, devices and systems which are described in this document. Furthermore, each of the aspects of the methods, devices and systems which are described in this document can be combined with one another in a variety of ways. In particular, the features of the claims can be combined with one another in a variety of ways.

DETAILED DESCRIPTION OF THE DRAWINGS

Figure 2:
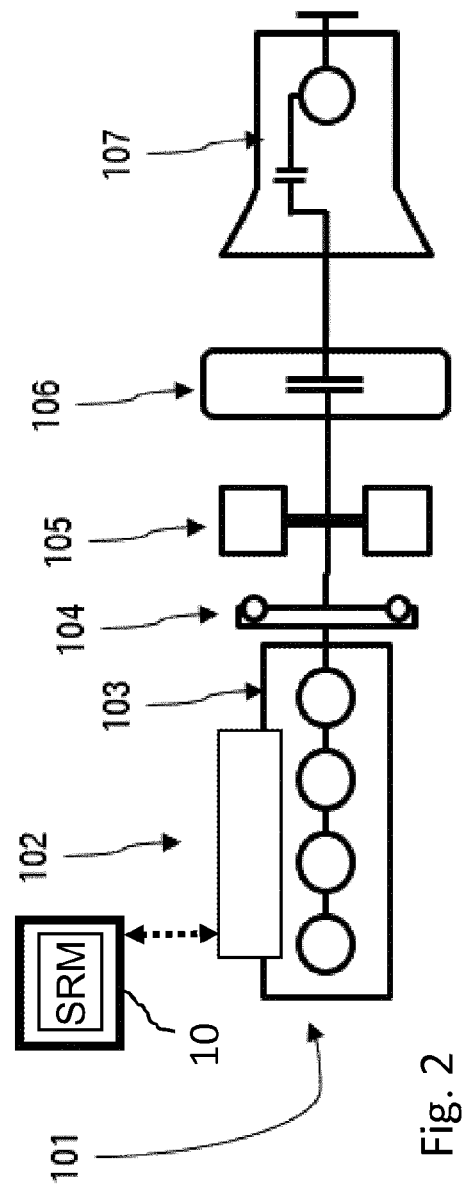
FIG. 2 shows a so-called P1 drive train with a drag-torque-reducing measure which can be activated and deactivated according to the invention.
Figure 3:
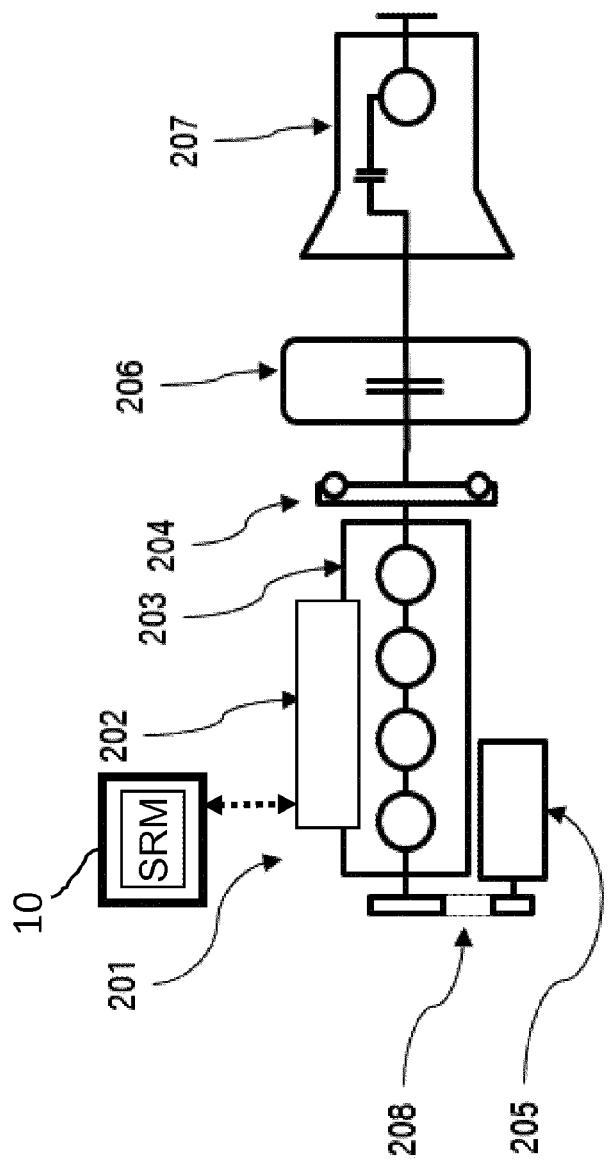
FIG. 3 shows a so-called P0 drive train with a drag-torque-reducing measure which can be activated and deactivated according to the invention.

As presented at the beginning, the present document is concerned with the operation of a hybrid drive, in particular for activating at least one drag-torque-reducing measure. In this context, FIGS. 1, 2 and 3 show schematic illustrations of a vehicle with exemplary hybrid drive topologies.

Figure 1:
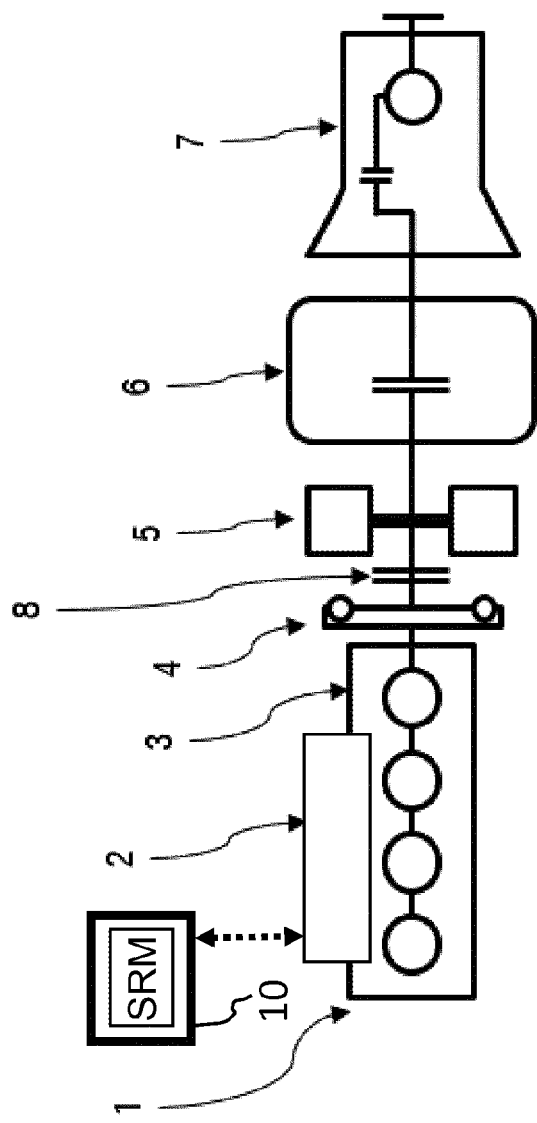
FIG. 1 shows a so-called P2 drive train with a drag-torque-reducing measure which can be activated and deactivated according to the invention.

In FIG. 1, a P2 drive train comprises an internal combustion engine 3 and an electric machine 5, which can be used individually or together, in order to generate a drive torque for a vehicle 1. The internal combustion engine 3 and the electric machine 5 are arranged in such a way that the torques which are generated by the respective drive motor are added to form a total drive torque which is transmitted, for example, via a transmission 7 and an output shaft of the transmission 7 to one or more wheels of the vehicle 1. The electrical energy for operating the electric machine 5 can be stored in an electrical energy store.

The vehicle 1 also comprises a control unit 10 (e.g., an engine control apparatus) which is configured to determine a requested total drive torque. The requested total drive torque can be specified by a driver of the vehicle, e.g., by means of an accelerator pedal and/or by means of a setting of the transmission 7. For example, a driver can activate the accelerator pedal in order to request an increased total drive torque. The control unit 10 can be configured to divide the requested total drive torque into a first torque (for the internal combustion engine 3) and a second torque (for the electric machine 5). In other words, the control unit 10 can be configured to operate the internal combustion engine 3 and the electric machine 5 as a function of a requested total drive torque.

FIG. 1 shows the part of the drive train of a vehicle with a P2 parallel hybrid drive in which the drive torques of the engine 3 and motor 5 act additively on the common input shaft of the transmission 7. Furthermore, FIG. 1 shows a clutch 8 with which the internal combustion engine 3 and the electric motor 5 can be decoupled. Additionally, it is to be noted that a starter element 6 and optionally a rotary vibration damper 4, which does not necessarily have to be located at the position illustrated in FIG. 1, can be provided. The internal combustion engine 3 has in each case at least one valve control device 2 for the inlet valves and outlet valves which in combination with an SRM ("drag torque reduction measure") functional module of the control unit 10 provide the drag torque reduction measure according to the invention.

FIG. 2 shows the part of the drive train of a vehicle 101 with a P1 parallel hybrid drive architecture in which the electric machine 105 acts directly on the crankshaft, without the presence of a clutch which is present between the electric machine 105 and the internal combustion engine 103. Further components are, in a way analogous to FIG. 1, a valve control device 102 for the inlet valves and outlet valves, which provide the drag reduction measure according to the invention in combination with an SRM module of the control unit 10 as well as an optional rotary vibration damper 104, a starter element 106 and a transmission 107.

FIG. 3 shows the part of the drive train of a vehicle 201 with a P0 parallel hybrid drive architecture in which the electric machine 205 is permanently coupled to the internal combustion engine 203 via a connecting element 208 (typically a belt connection) without the presence of a clutch between the electric machine 205 and internal combustion engine 203. Further components are, in a manner analogous to FIG. 1 and FIG. 2, a valve control device 202 for the inlet valves and outlet valves which, in combination with an SRM module of the control unit 10, provide the drag reduction measure according to the invention, as well as an optional rotary vibration damper 204, a starter element 206 and a transmission 207.

The internal combustion engine 1, 101, 201 of a hybrid drive can be at least temporarily deactivated, e.g., in the case of (under certain circumstances purely) electric operation of the hybrid drive and/or in the case of recuperation in so-called overrun mode when the wheels of the vehicle drive the output shaft. The driveshaft of the deactivated internal combustion engine 1, 101, 201 can therefore be driven and/or entrained, in a non-activated, entrained mode, by the electric machine 2 (with the clutch 8 closed), 102, 202 and/or by the one or more wheels of the vehicle 1, 101, 201. A mode of the internal combustion engine which is non-activated and entrained has the advantage that the internal combustion engine can be activated again at short notice and efficiently, in order to contribute drive torque to the total drive of the vehicle.

According to the invention, in order to reduce the relatively high drag losses occurring according to the prior art at least one drag torque-reducing measure is carried out, specifically by closing the inlet valves and outlet valves by means of the valve control devices 2, 102, 202 in combination with an SRM module of the control unit 10.

The functional module SRM of the control unit 10 picks up input signals for checking for the presence of the specified conditions. Output signals of the control unit 10 control the actuators of the valve control devices 2 at least in order to close the inlet valves and outlet valves.

The present invention is not limited to the exemplary embodiments shown. It is in particular to be noted that the description and the figures are intended to illustrate only the principle of the proposed methods, devices and systems.

What is claimed is:

1. A controller for a hybrid drive which includes an internal combustion engine and an electric machine, wherein the internal combustion engine includes adjustment devices that deactivate an opening actuation of inlet valves and outlet valves, the controller comprising:
   a processor programmed to execute instructions; and
   a memory coupled to the processor and having the instructions stored therein, wherein the instructions are configured to cause the processor to:

cause the adjustment devices to deactivate the opening actuation of the inlet valves and the outlet valves based on a determination that the internal combustion engine is non-activated, the internal combustion engine is connected to the electric machine via a closed clutch, and a specified condition of purely electric driving of the hybrid drive is present;

wherein the controller provides fully variable valve stroke control on an inlet side and simple deactivation of a valve drive by a first switching actuator system on an outlet side; and wherein the controller is configured such that the inlet valves and the outlet valves are kept closed in a deactivated state only in a case in which a rotational speed of the internal combustion engine has not undershot a minimum rotational speed limit for self-sustained operation.

2. The controller according to claim 1, wherein the specified condition is purely electric driving in a charge sustaining mode of a plug-in hybrid electric vehicle (PHEV).

3. The controller according to claim 1, wherein the specified condition is purely electric driving in a mode from which a defined comparatively high starting frequency is expected.

4. The controller according to claim 1, wherein the adjustment devices include a fully variable valve stroke control means or a valve opening actuator of the valve drive by a second switching actuator system on the inlet side, and a valve opening actuator of the valve drive by the first switching actuator system on the outlet side.

5. A method for operating a hybrid drive including an internal combustion engine and an electric machine, the method comprising:

controlling, by a controller, inlet valves and outlet valves to be kept closed by controlling adjustment devices;

deactivating, by the controlling adjustment devices, an opening actuation of the inlet valves and the outlet valves based on determinations that the internal combustion engine is non-activated, the internal combustion engine is connected to the electric machine via a closed clutch, and a specified condition of purely electric driving of the hybrid drive is present;

providing, by the controller, fully variable valve stroke control on an inlet side and simple deactivation of a valve drive by a switching actuator system on an outlet side; and keeping the inlet valves and the outlet valves closed in a deactivated state only in a case in which a rotational speed of the internal combustion engine has not undershot a minimum rotational speed limit for self-sustained operation.

* * * * *